US012664416B2

(12) United States Patent
Gong et al.

(10) Patent No.: US 12,664,416 B2
(45) Date of Patent: Jun. 23, 2026

(54) NON-VOLATILE MEMORY-BASED ACTIVATION FUNCTION

(71) Applicant: International Business Machines Corporation, Armonk, NY (US)

(72) Inventors: Nanbo Gong, White Plains, NY (US); Takashi Ando, Eastchester, NY (US); Guy M. Cohen, Westchester, NY (US); Malte Johannes Rasch, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 18/083,673

(22) Filed: Dec. 19, 2022

(65) Prior Publication Data

US 2024/0202512 A1    Jun. 20, 2024

(51) Int. Cl.
| | |
|---|---|
| G06N 3/04 | (2023.01) |
| G06N 3/048 | (2023.01) |
| G06N 3/065 | (2023.01) |

(52) U.S. Cl.
CPC ............. G06N 3/065 (2023.01); G06N 3/048 (2023.01)

(58) Field of Classification Search
CPC .............................. G06N 3/048; G06N 3/065
See application file for complete search history.

(56) References Cited

U.S. PATENT DOCUMENTS

| | | | |
|---|---|---|---|
| 10,733,503 B2 | 8/2020 | Zamora Esquivel | |
| 11,038,520 B1 | 6/2021 | Narayanan | |
| 11,087,205 B2 | 8/2021 | Haiut | |
| 11,270,187 B2 | 3/2022 | Choi | |
| 11,361,213 B1 | 6/2022 | Duong | |
| 11,615,316 B1 * | 3/2023 | Kendall | ................. G06N 3/047 |
| | | | 706/25 |
| 2020/0005143 A1 * | 1/2020 | Zamora Esquivel | .. G06N 3/047 |

(Continued)

FOREIGN PATENT DOCUMENTS

| | | |
|---|---|---|
| CN | 113054947 A | 6/2021 |
| CN | 113822422 A | 12/2021 |

(Continued)

OTHER PUBLICATIONS

Wen, Shiping, et al. "Memristive LSTM network for sentiment analysis." IEEE Transactions on Systems, Man, and Cybernetics: Systems 51.3 (2019): 1794-1804. (Year: 2019).*

(Continued)

*Primary Examiner* — Hal Schnee
(74) *Attorney, Agent, or Firm* — Scully, Scott, Murphy & Presser, P.C.; Kimberly S. Zillig

(57) ABSTRACT

Analog memory-based activation function for an artificial neural network can be provided. An apparatus can include at least two non-volatile memory devices connected in parallel such that the current can flow through one of the two non-volatile memory devices depending on the voltage level driving the current. To control which branch an input current flows through, each of the two non-volatile memory devices can be connected to a circuit element that can function as a switch, for example, a diode such as a semiconductor diode, a transistor, or another circuit element. Such apparatus can implement an analog memory-based activation function, for example, for an analog memory-based artificial neural network.

20 Claims, 4 Drawing Sheets

(56) References Cited

U.S. PATENT DOCUMENTS

| | | | |
|---|---|---|---|
| 2020/0034714 A1 | 1/2020 | Bae | |
| 2020/0167636 A1* | 5/2020 | Kwak | G06N 3/0499 |
| 2020/0257981 A1 | 8/2020 | Chae | |
| 2020/0364545 A1 | 11/2020 | Shattil | |
| 2021/0133565 A1 | 5/2021 | Shamir | |
| 2021/0264247 A1 | 8/2021 | Kang | |
| 2021/0350236 A1 | 11/2021 | Severa | |
| 2022/0101138 A1 | 3/2022 | Rhodes | |
| 2022/0138548 A1* | 5/2022 | Wang | G06V 10/776 |
| | | | 706/38 |
| 2022/0391688 A1 | 12/2022 | Rasch | |
| 2023/0083597 A1* | 3/2023 | Mohan | G06N 3/063 |
| | | | 706/41 |
| 2023/0325650 A1* | 10/2023 | Tran | G06N 3/065 |
| | | | 708/835 |

FOREIGN PATENT DOCUMENTS

| | | |
|---|---|---|
| CN | 120344978 A | 7/2025 |
| DE | 112023004611 T5 | 8/2025 |
| GB | 2638643 A | 8/2025 |
| WO | 2024/131362 A1 | 6/2024 |

OTHER PUBLICATIONS

Kiani, Fatemeh, et al. "A fully hardware-based memristive multilayer neural network." Science advances 7.48 (2021): eabj4801. (Year: 2021).*

International Search Report and Written Opinion dated Jan. 4, 2024 issued in PCT/CN2023/130052.

Maniatopoulos, A., et al., "Learnable Key ReLU (LeLeLU): An Alternative Accuracy-Optimized Activation Function", Information 2021, Received Oct. 27, 2021, Accepted Dec. 7, 2021, Published Dec. 9, 2021, 16 pages, 12, 513.

Jagtap, A.D., et al., "Locally Adaptive Activation Functions With Slope Recovery Term For Deep And Physic-Informed Neural Networks", arXiv:1909.12228v4 [cs.LG], Jun. 17, 2020, 19 pages.

Hsieh, Y.-T., et al., "Neural Network Design via Voltage-Based Resistive Processing Unit and Diode Activation Function—A New Architecture", Conference Paper • Aug. 2021, 5 pages.

Bao H., et a., "Quantization And Sparsity-Aware Processing For Energy-Efficient NVM-Based Convolutional Neural Networks", Frontiers in Electronics, Received May 27, 2022, Accepted Jul. 11, 2022, Published Aug. 12, 2022, 12 pages.

Narayanan, P., et al., "Reducing Circuit Design Complexity for Neuromorphic Machine Learning Systems Based on Non-Volatile Memory Arrays", 2017 IEEE International Symposium on Circuits and Systems (ISCAS), May 2017, 4 pages.

Ando Takashi "Hardware Algorithm Co-optimization for Scalable Analog Compute Technology", SISC 2022, Dec. 8, 2022, 05 pages.

Intellectual Property Office, Patents Act 1977: Examination Report under Section 18(3), Feb. 12, 2026, 03 Pages, GB Application No. 2509616.5.

* cited by examiner

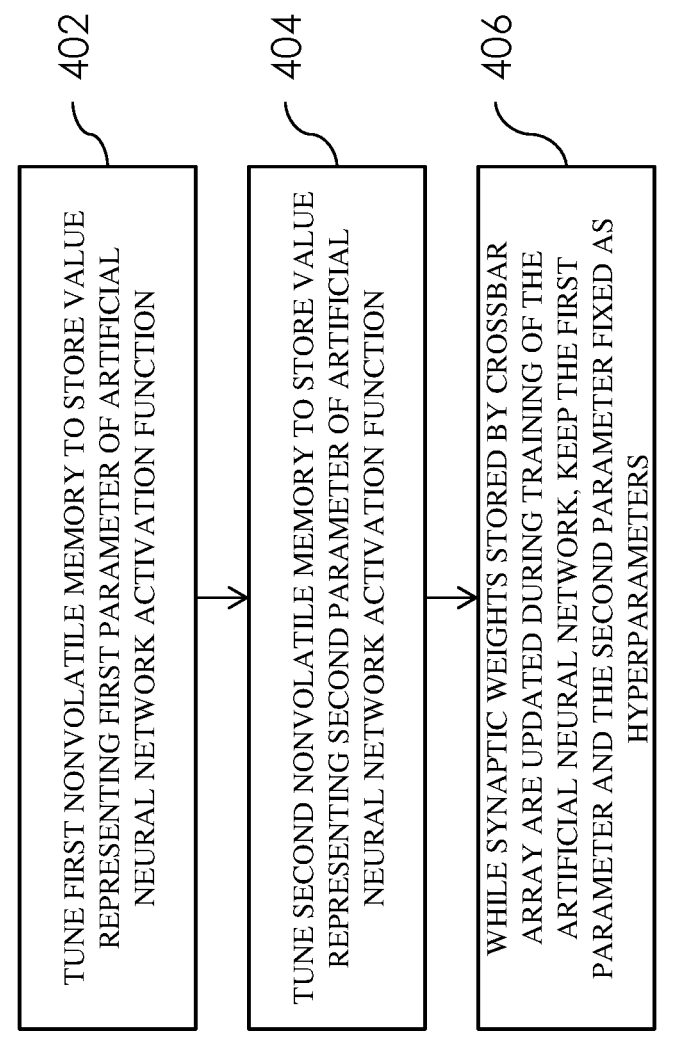

402 — TUNE FIRST NONVOLATILE MEMORY TO STORE VALUE REPRESENTING FIRST PARAMETER OF ARTIFICIAL NEURAL NETWORK ACTIVATION FUNCTION

404 — TUNE SECOND NONVOLATILE MEMORY TO STORE VALUE REPRESENTING SECOND PARAMETER OF ARTIFICIAL NEURAL NETWORK ACTIVATION FUNCTION

406 — WHILE SYNAPTIC WEIGHTS STORED BY CROSSBAR ARRAY ARE UPDATED DURING TRAINING OF THE ARTIFICIAL NEURAL NETWORK, KEEP THE FIRST PARAMETER AND THE SECOND PARAMETER FIXED AS HYPERPARAMETERS

FIG. 4

NON-VOLATILE MEMORY-BASED ACTIVATION FUNCTION

BACKGROUND

The present application relates generally to analog memory-based artificial neural networks and more particularly to analog-based or non-volatile memory-based activation functions, which can be tunable, for deep learning.

Analog memory crossbar arrays implementing multiply and accumulate operations can accelerate performance of deep learning neural networks or deep neural networks (DNNs). Activation functions, which transform linear outputs of such MAC operations as neuron outputs are generally implemented in digital circuits, for example, using analog-to-digital converters.

BRIEF SUMMARY

The summary of the disclosure is given to aid understanding of analog memory-based or non-volatile memory-based activation functions, for example, for deep learning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

An apparatus, in an aspect, can include a first non-volatile memory connected to a positive terminal of a first diode. The first non-volatile memory can be programmed to store a first parameter of an activation function associated with an artificial neural network. The apparatus can also include a second non-volatile memory connected to a negative terminal of a second diode. The second non-volatile memory can be programmed to store a second parameter of the activation function associated with the artificial neural network. The first non-volatile memory and the second non-volatile memory can be connected in parallel to an input line, and a negative terminal of the first diode and a positive terminal of the second diode can be connected in parallel to an output line.

Advantageously, implementing an analog memory-based activation function can provide energy efficiency in analog memory-based neural network implementation.

In an aspect, the activation function can include a leaky rectified linear unit (ReLU), where a first slope of the leaky ReLU can be defined by the first parameter stored on the first non-volatile memory, and a second slope of the leaky ReLU can be defined by the second parameter stored on the second non-volatile memory. The first parameter can be proportional to conductance of the first non-volatile memory and the second parameter can be proportional to conductance of the second non-volatile memory.

Advantageously, implementing an analog memory-based leaky rectified linear unit (ReLU) activation function can provide energy efficiency in analog memory-based neural network implementation.

In another aspect, the activation function can include a rectified linear unit (ReLU), where a first slope of the ReLU can be defined by the first parameter stored on the first non-volatile memory, and a second slope of the ReLU can be defined by the second parameter stored on the second non-volatile memory. The first parameter can be proportional to conductance of the first non-volatile memory and the second parameter can be proportional to conductance of the second non-volatile memory.

Advantageously, implementing an analog memory-based rectified linear unit (ReLU) activation function can provide energy efficiency in analog memory-based neural network implementation.

An apparatus, in another aspect, can include a first non-volatile memory connected to a first field effect transistor (FET). The first non-volatile memory can be programmed to store a first parameter of an activation function associated with an artificial neural network. The apparatus can also include a second non-volatile memory connected to a second field effect transistor (FET). The second non-volatile memory can be programmed to store a second parameter of the activation function associated with the artificial neural network. The first non-volatile memory and the second non-volatile memory can be connected in parallel to an input line. The first field effect transistor and the second field effect transistor can be connected in parallel to an output line, where a source terminal of the first field effect transistor can be connected to the first non-volatile memory and a source terminal of the second field effect transistor can be connected to the second non-volatile memory, and where a drain terminal of the first field effect transistor and the drain terminal of the second field effect transistor can be connected to the output line.

Advantageously, implementing an analog memory-based activation function can provide energy efficiency in analog memory-based neural network implementation.

A method, in an aspect, can include tuning a first non-volatile memory connected to a column output of a crossbar array of memristive elements, for the first non-volatile memory to store a first parameter of an activation function of an artificial neural network. The method can also include tuning a second non-volatile memory connected to the column output of the crossbar array of memristive elements, for the second non-volatile memory to store a second parameter of the activation function of the artificial neural network. The method can also include keeping the first parameter and the second parameter fixed as hyperparameters of the artificial neural network, while synaptic weights stored in the memristive elements of the crossbar array are updated during training of the artificial neural network.

Advantageously, implementing an analog memory-based activation function can provide energy efficiency in analog memory-based neural network implementation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 is a flow diagram illustrating a method in an embodiment.

DETAILED DESCRIPTION

Analog memory-based neural network may utilize storage capability and physical properties of memory devices such as non-volatile memory devices to implement an artificial neural network. This type of in-memory computing hardware increases speed and energy efficiency, providing potential performance improvements. For example, rather than moving data from dynamic random access memory (DRAM) to a processor such as a central processing unit (CPU) to perform a computation, analog neural network chips perform computation in the same place where the data is stored. Because there is no movement of data, tasks can be performed faster and require less energy. In one or more embodiments, analog memory-based or non-volatile memory-based activation functions are provided.

An implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs applied to an activation function, and weighted signals can be propagated over successive layers of the network from an input to an output neuron layer. Briefly, an activation function decides whether a neuron should be activated, or a level of activation for a neuron, for example, an output of the neuron. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

Figure 1:
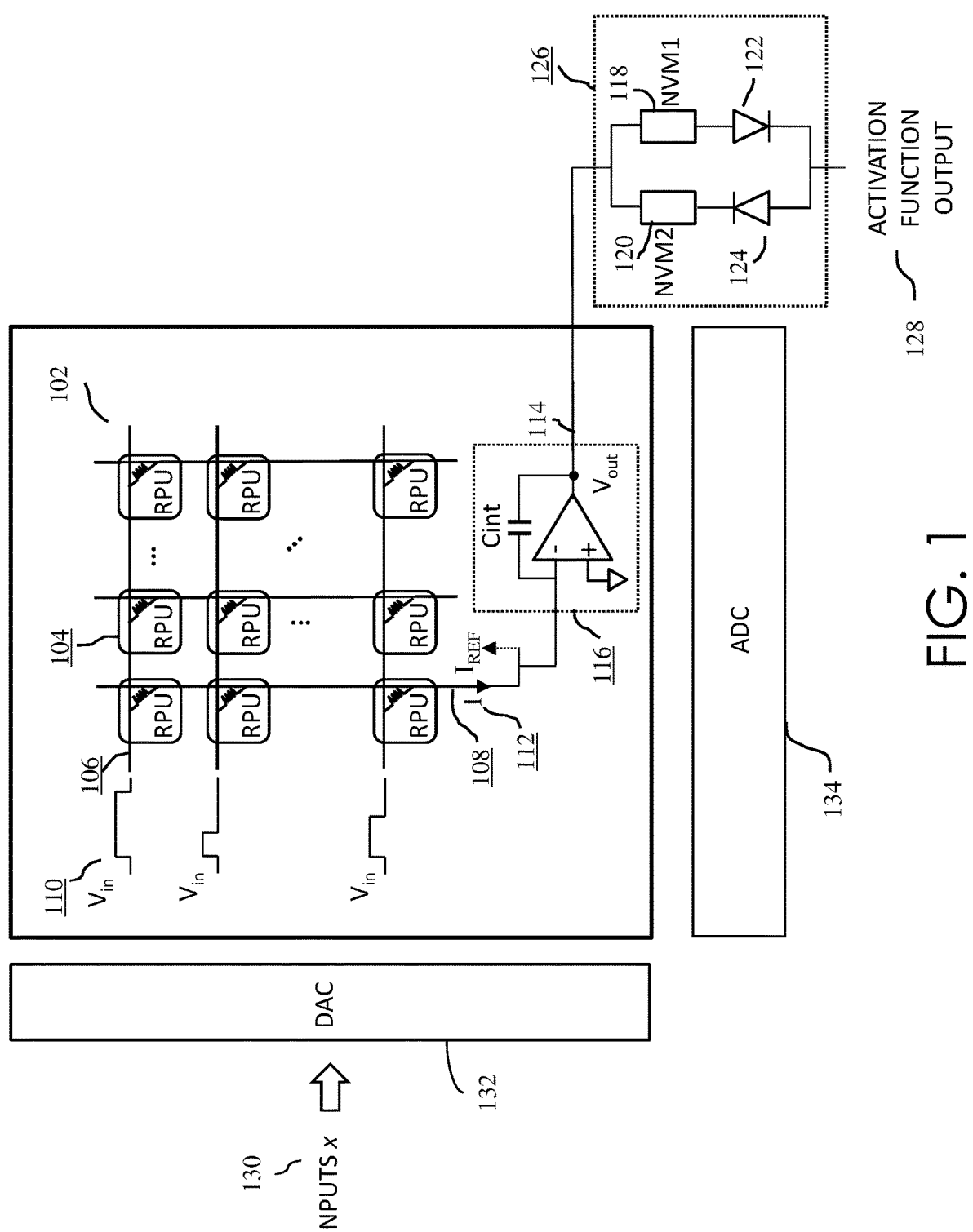
FIG. 1 is a diagram illustrating an analog-memory based neural network in an embodiment.

FIG. 1 is a diagram illustrating an analog-memory based neural network in an embodiment. The analog-memory base neural network includes non-volatile memory-based activation functions. For instance, circuit elements including non-volatile memories can implement an activation function of a neural network. Briefly, a non-volatile memory (NVM) device (also referred to as a memristive device or technology) can maintain values stored on such even when the power supply is turned off. In neural network implementations, those values can represent synaptic weights or weights of a neural network.

Computational memories based on crossbar arrays (a crossbar array shown at 102 for simplicity of explanation) using electronic devices including resistive NVM devices 104, labeled as resistive processing units (RPUs), can be used for artificial neural network (ANN) computations, for example, for training a deep neural network (DNN) and/or as inference accelerators for inferences with such networks. For instance, in deep learning or neural network inference, data propagation through multiple layers of a neural network involves a sequence of matrix multiplications. Each layer can be represented as a matrix of synaptic weights. These weights can be stored in the conductance states of NVM devices 104. These NVM devices 104 can be arranged in crossbar arrays, creating an artificial neural network where all matrix multiplications are performed in-place in an analog manner. For example, the arrays on the chip can directly relate to the synapse layers of the neural network. In an embodiment, for instance, a crossbar array can represent a layer of the neural network.

For example, a multiply accumulate (MAC) device can include NVM devices arranged in a crossbar configuration, e.g., as a crossbar array 102, and can perform an analog matrix-vector multiplication in a single time step. Such MAC devices can be used to implement hardware or analog memory-based neural network.

Examples of such memory devices can include, but are not limited to, resistive random access memory (RRAM or ReRAM), Electrochemical Random-Access Memory (ECRAM), ferroelectric random access memory (FeRAM), phase-change memory (PCM), conductive-bridging RAM (CBRAM), NOR flash, magnetic RAM (MRAM).

Analog memory-based devices can implement a hardware neural network in an embodiment. For example, in a system that includes crossbar arrays with analog memory-based devices, e.g., as a co-processor or accelerator, one or more digital processors can communicate with the co-processor in performing its operations or functions for various applications.

In an embodiment, such device can be a co-processor or accelerator including multiply accumulate (MAC) hardware having a crossbar structure or array, e.g., shown at 102. While the figure shows a crossbar array, there can be many of those arrays integrated on a coprocessor. By way of example, an analog multiply accumulate device can include electronic devices including memory elements 104, which are arranged at cross points of the crossbar array 102. For example, at each cross point or junction of the crossbar structure or crossbar array, there can be at least one electronic device 104 including a resistive memory or memristive element. In an embodiment, such resistive memory element can be programmed to store synaptic weights of an artificial neural network (ANN). Each array 102 can represent a layer of an ANN. For example, a co-processor may include, at each crossing point, one of the resistive memory elements 104 connecting a respective one of the input lines 106 with a respective one of the output lines 108. The array 102 may be a regular array with a constant distance between its crossing points in a horizontal and vertical dimension on the surface of a substrate. Each crossbar array 102 can perform vector-matrix multiplication. By way of example, an array 102 can include peripheral circuitry such as pulse width modulators and peripheral circuitry such as analog-to-digital converters (ADCs).

By way of example, a device such as a co-processor including the crossbar array 102 can be interfaced to a hardware including another processor such as a field programmable gate array (FPGA). There can also be digital-to-analog converters, which can provide the power supplies, the voltage and current to the co-processor. For instance, a digital-to-analog converter 132 can convert digital input data (referred to as input x) 130 to analog signals (e.g., 110) input to the crossbar array 102. A processor such as a field programmable gate array (FPGA) can implement digital logic to interface with the co-processor and the electronics of the digital-to-analog converters.

Electrical pulses or voltage signals 110 can be input (or applied) to input lines 106 of the crossbar structure 102. Output currents 112 can be obtained from output lines 108 of the crossbar structure, for example, generated according to a multiply-accumulate operation, based on the input pulses or voltage signals 110 applied to input lines 106 and the values (synaptic weights) stored on the resistive memory elements 104. Output 114 can be read out at a readout circuit 116.

Additional circuit elements (collectively referred to as analog-based activation function device for explanation only) that include at least non-volatile memory devices can be connected to output lines 108 to implement analog-memory based activation functions. For instance, an output from a column of the crossbar array, the output which represents a multiply accumulate operation (a linear operation) performed for a neuron of a neural network, can be connected to input of the circuit elements that implement an analog-memory based activation function. In an embodiment, the circuit elements can include two non-volatile memory devices 118, 120 and a diode 122, 124 connected to each of the two non-volatile memory devices. Diodes can be used to control or select the direction of the current (column output of the crossbar array) in the analog-based activation function device. Diodes can be semiconductor diodes having at least a positive terminal and a negative terminal, such as a p-n junction diode. A diode at 122 (referred to as a first diode for explanation) can be connected to a non-volatile memory device at 118 (referred to as a first non-volatile memory device for explanation) with the positive terminal of the first diode being closer to the first non-volatile memory device 118. A diode at 124 (referred to as a second diode for explanation) can be connected to a non-volatile memory device at 120 (referred to as a second non-volatile memory device) with the negative terminal of the second diode being closer to the second non-volatile memory device 120. The first non-volatile memory device 118 and the first diode 122 are connected in series with respect to one another; The second non-volatile memory device 120 and the second diode 124 are connected in series with respect to one another. The two sets of the non-volatile memory device and diode are connected in parallel: e.g., the first non-volatile memory device 118 and the first diode 122 are connected in parallel to the second non-volatile memory device 120 and the second diode 124. The output 108 or 114, travels to both of the parallel paths.

Figures 2A, 2B:
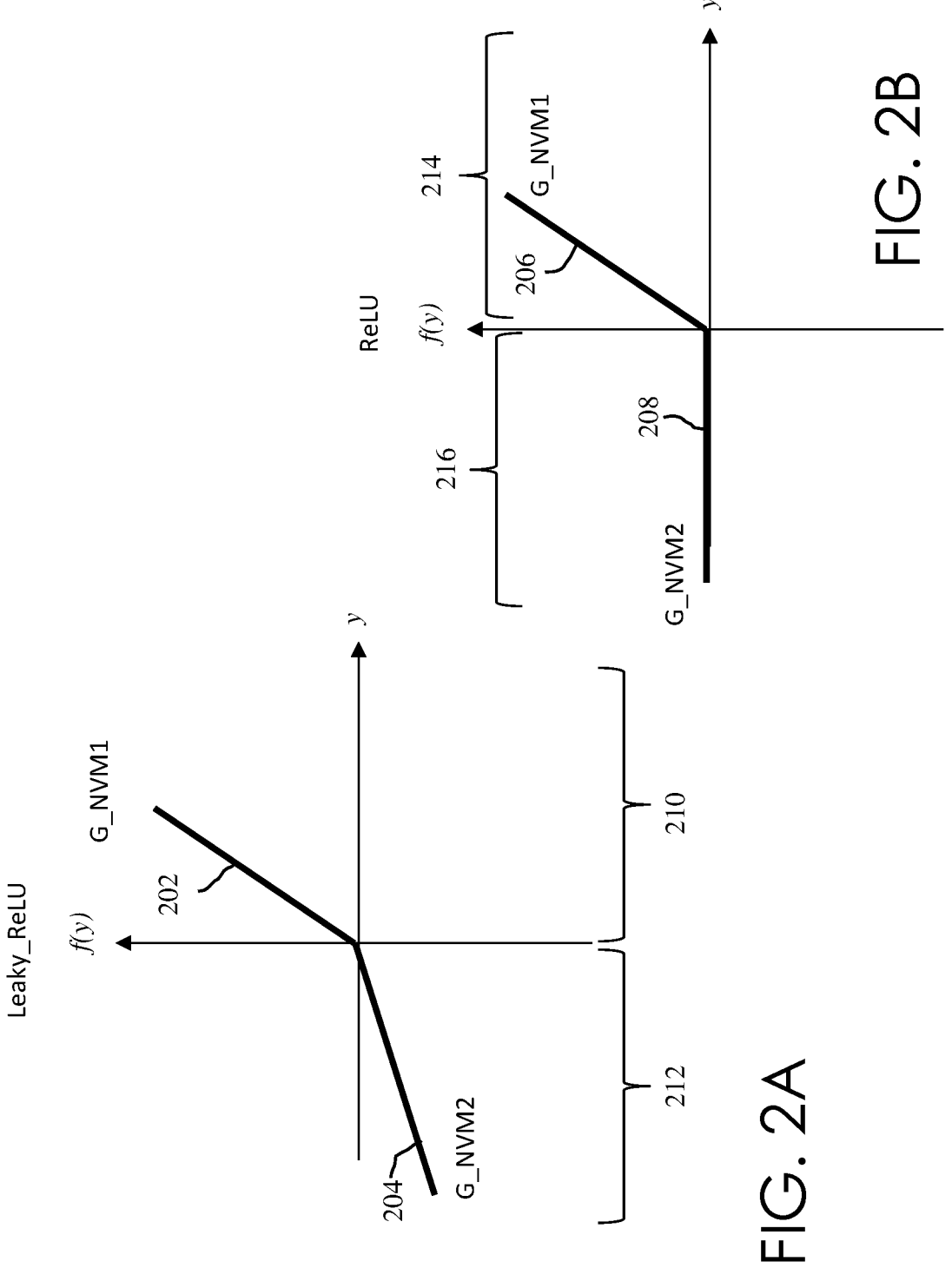
FIG. 2A shows an example Leaky Rectified Linear Unit (ReLU) activation function.
FIG. 2B shows an example Rectified Linear Unit (ReLU) activation function.

The two NVMs 118, 120 and diodes 122, 124 implement an activation function such as a Leaky Rectified Linear Unit (ReLU). Another example of an activation function, which the two NVMs 118, 120 and diodes 122, 124 can represent, includes a ReLU activation function. FIG. 2A shows a Leaky Rectified Linear Unit (ReLU) activation function. FIG. 2B shows a Rectified Linear Unit (ReLU) activation function. Output of a multiply accumulate operation at each column 108 can be input to the activation function implemented by the two NVMs 118, 120 and diodes 122, 124, where a non-linear operation occurs in the neural network. Leaky ReLU has a slope 202 for positive values 210 of output 108, and a smaller slope 204 for negative values 212 of output 108, instead of a flat slope, which ReLU has (ReLU is shown in FIG. 2B). For example, in FIG. 2B, which shows a ReLU activation function, slope 208 in the negative region 216 is flat or zero, while there is a non-zero slope 206 in the positive region 214. In FIG. 2A and FIG. 2B, the x-axis represents the output values 108 (of MAC operations) and the y-axis represents the activation values.

In an embodiment, the slope coefficient is determined before training of the neural network, i.e., it is not learnt during training of the weights stored in the non-volatile memory devices 104 in the crossbar array. For example, in an embodiment, the slope values can be stored in the two NVMs 118, 120, as hyperparameters. Those values remain fixed during the training of the neural network.

In an embodiment, the first non-volatile memory device 118 can store the slope 202 of Leaky ReLU to be applied when the output values 108 are positive (e.g., greater than 1); the second non-volatile memory device 120 can store the slope 204 of Leaky ReLU to be applied when the output values 108 are negative (e.g., less than 1).

In another embodiment, to implement a ReLU activation function, the first non-volatile memory device 118 can store the slope 206 of ReLU to be applied when the output values 108 are positive (e.g., greater than 1); the second non-volatile memory device 120 can store a substantially flat slope (or substantially zero value) 208 of ReLU to be applied when the output values 108 are negative (e.g., less than 1).

Examples of non-volatile memory devices 118, 120 used for implementing the activation function can include similar devices used for RPUs 104. Different types of non-volatile memory based on different physical mechanisms can be used: for example, phase-change memory where phase-change material sandwiched between two electrodes can be used to control conductance or resistivity by changing amorphous or crystalline states, resistive random access memory where filament between the structure can be used to control conductance or resistivity, ferroelectric memory where polarization can be used for controlling conductance or resistivity. Generally, resistance or conductance can be fine-tuned to store information and perform an activation function.

As described above, different rows 106 of the crossbar array represent different inputs, and different columns 108 of the crossbar array represent different outputs. Using the crossbar array, linear matrix operations can be performed and the outputs on columns can be collected. For example, multiply accumulate operations on the crossbar array 102 are followed by non-volatile memory based activations. The non-volatile memory conductance is related to a slope of leaky ReLU. Applying the outputs to the activation function device 126 introduces the non-linearity aspect of the neural network. In an embodiment, each of the output columns 108 can be connected to a respective readout circuit and activation function device 126.

An embodiment of the activation function device 126 may operate as follows. Based on the column-wise voltage (voltage from each column 108 or 114), one of the diodes 122 and 124 can be turned on. Leaky ReLU is represented because based on whether the output voltage is positive or negative, the current will go into a different diode branch, e.g., either 118/122 or 120/124. For example, a positive voltage applied to device 126 (e.g., Vout 114 is positive) would turn on the diode at 122, since the positive terminal of that diode 122 connects to the crossbar array's column output (via NVM at 118), e.g., allowing the current to flow as in forward bias state, while the current flow would be restricted in the diode at 124 as in reverse bias state. Similarly, a negative voltage applied to device 126 (e.g., Vout 114 is negative) would turn on the diode at 124, since the negative terminal of that diode 124 connects to the crossbar array's column output (via NVM at 120) allowing the current to flow as in forward bias state via the diode 124, while the current flow would be restricted in the diode at 122 as in reverse bias state. The conductance or resistive values of the memories 118 and 120 would be different, representing different slopes of the leaky ReLU. Similarly, for implementing a ReLU activation function, the value of NVM at 118 would be set to some slope (pre-determined) while the value of NVM at 120 would be set to a substantially zero value (substantially flat slope). The activation function device 126 outputs or generates an activation function output 128. The activation output 128 can further be processed. For example, the activation output 128 can be converted into a digital form by an analog-to-digital converter 134, for example, for further processing by a digital computer. In another aspect, the activation output 128 can be input to another crossbar array for processing by that other crossbar array. While there can be one or more analog-to-digital converters as shown at 134, for example, as peripheral circuitry to the crossbar array, the need for an analog-to-digital converter for performing an activation function (e.g., in a digital computer) can be eliminated, which can further provide for savings in power, since the activation function computation can be performed entirely in analog-based memory devices.

An apparatus that implements an analog memory-based activation function can be provided. Such apparatus can include two non-volatile memory devices connected in parallel, for example, referred to as a first non-volatile memory and a second non-volatile memory, such that the current can flow through one of the two non-volatile memory devices depending on the voltage level driving the current. To control which branch the current would flow through, each of the two non-volatile memory devices can be connected to a switch or a circuit element that can function as a switch, for example, a diode such as a semiconductor diode, a transistor, or another circuit element. Such apparatus can implement an analog memory-based activation function, for example, for an analog memory-based artificial neural network.

In an embodiment, an apparatus can include a first non-volatile memory connected to a positive terminal of a first diode. The first non-volatile memory can be programmed or tuned to store a first parameter of an activation function associated with an artificial neural network. The apparatus can also include a second non-volatile memory connected to a negative terminal of a second diode, where the second non-volatile memory can be programmed or tuned to store a second parameter of the activation function associated with the artificial neural network. The first non-volatile memory and the second non-volatile memory can be connected in parallel to an input line, and a negative terminal of the first diode and a positive terminal of the second diode can be connected in parallel to an output line. In this way, for example, a signal entering the input line can pass through one of the two non-volatile memory path or branch, depending on the value of the signal (e.g., voltage level), and can be transformed according to the activation function (e.g., with its parameters) into an activation function output, and output via the output line.

In an embodiment, the activation function can include a leaky rectified linear unit (ReLU), where a first slope of the leaky ReLU can be defined by the first parameter stored on the first non-volatile memory, and a second slope of the leaky ReLU can be defined by the second parameter stored on the second non-volatile memory. In an aspect, the first parameter can be proportional to conductance of the first non-volatile memory and the second parameter can be proportional to conductance of the second non-volatile memory.

In another embodiment, the activation function can include a rectified linear unit (ReLU), where a first slope of the ReLU can be defined by the first parameter stored on the first non-volatile memory, and a second slope of the ReLU can be defined by the second parameter stored on the second non-volatile memory, where the second slope is substantially flat, e.g., a zero or a value representing a zero substantially. For example, the second slope can be substantially smaller than the first slope, for instance, 100 times smaller by way of example.

In an embodiment, the apparatus may also include a crossbar array of memristive elements configured to perform multiply and accumulate operations, where at least one column output line of the crossbar array is connected to the input line. For instance, each of the column output lines of the crossbar array can be connected to a set of circuit elements implementing an analog memory-based activation function (e.g., at least two non-volatile memory devices connected with diodes).

In an embodiment, the first parameter and the second parameter remain fixed as hyperparameters of the artificial neural network during training of the artificial neural network, while values stored on the memristive elements of the crossbar array are updated as part of the training.

Non-volatile memory reserves information even when the power supply is turned off. In an aspect, non-volatile memory with diode or diode structure provides efficiency for DNN acceleration. The presence of NVM elements in addition to diodes enables tuning of Leaky ReLU parameters.

Figure 3:
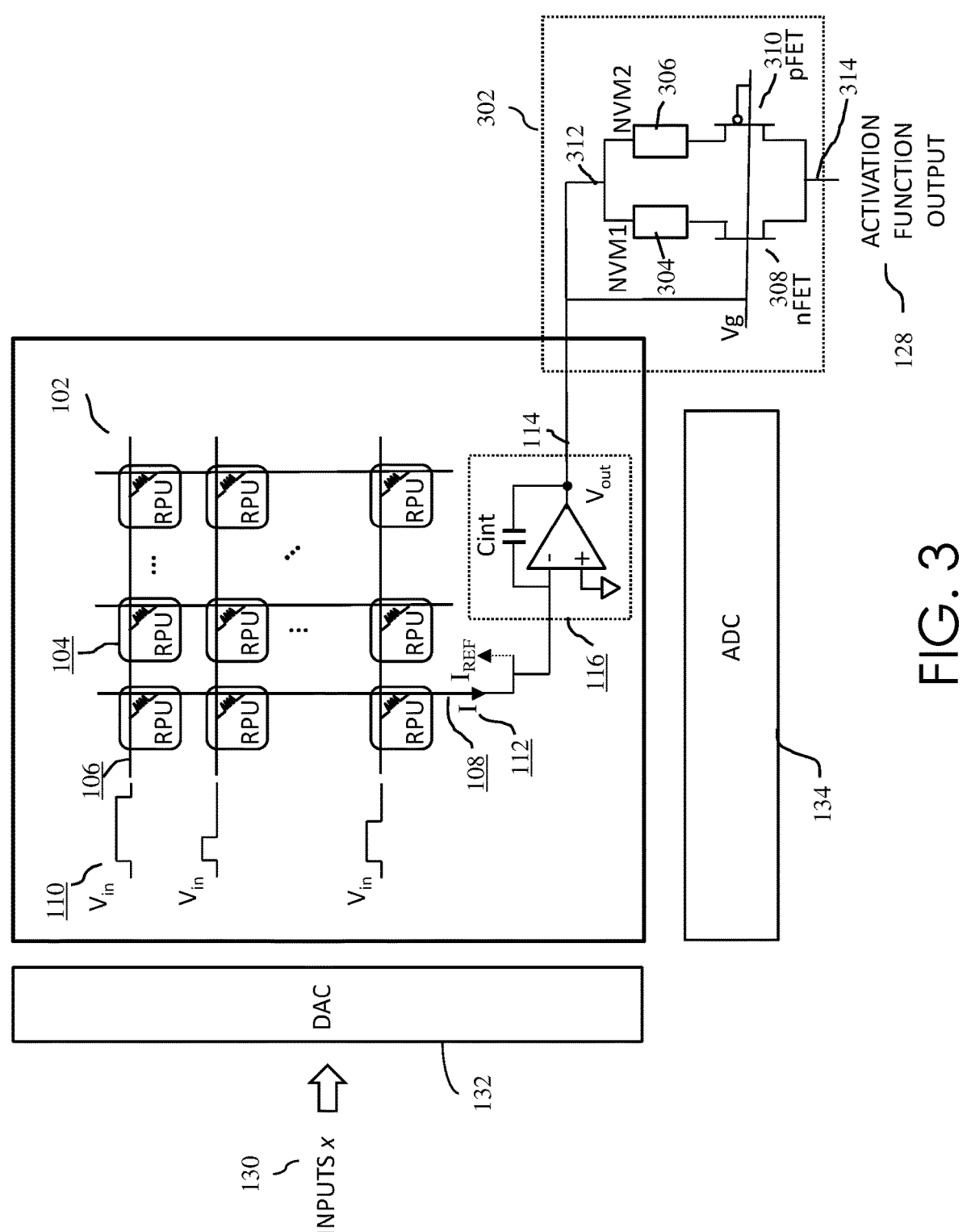
FIG. 3 is a diagram illustrating an analog-memory based neural network with non-volatile memory-based activation function in another embodiment.

FIG. 3 is a diagram illustrating an analog-memory based neural network with non-volatile memory-based activation function in another embodiment. The crossbar array 102 and its components, and also its periphery circuit, e.g., 132, 134 operate similarly as described above with reference to FIG. 1. In this embodiment, an analog-based activation function device 302 can be implemented using pairs of elements, a pair including at least a non-volatile memory (e.g.: 304, 308; e.g.: 306, 310) device and a transistor device. For instance, the diodes 122, 124 shown in FIG. 1 can be replaced by transistors, for example, field effect transistors (FETs) such as nFET and pFET, where the source is toward the column output 114, the drain is toward the activation function output 128. For example, FETs have three terminals and can conduct current between two terminals (the source and the drain) when a third terminal (the gate, e.g., shown as Vg) is driven by an appropriate signal. For example, gate Vg can be synchronized to a column output 108 or a readout of the column output 114. A FET has a threshold voltage (Vt), the voltage between the gate and source that is needed to create a conducting path between the source and drain terminals. For nFET, if Vg is greater than or equal to Vt (Vg>=Vt), nFET turns on, if Vg is less than Vt (Vg<Vt), nFET turns off. For pFET, if Vg<Vt, pFET turns on, and if Vg>=Vt, pFET turns off. For instance, Vg being high or low is relative to corresponding Vt of the FET. When Vg is higher than nFET Vt, then nFET 308 is turned on, and because the Vg is higher than pFET Vt, pFET 310 is turned off. Similarly, when Vg is lower than nFET Vt, nFET 308 is turned off, and because this Vg is also lower than pFET Vt, pFET 310 is turned on. In an embodiment, in which the activation function device 302 represents a Leaky ReLU activation function, the non-volatile memory at 304 stores, or is tuned with, a first slope of Leaky ReLU, i.e., the slope (e.g., 202) of the positive region (e.g., 210); the non-volatile memory at 306 stores, or is tuned with, a second slope of Leaky ReLU, i.e., the slope (e.g., 204) of the negative region (e.g., 212). In another embodiment, in which the activation function device 302 represents a ReLU activation function, the non-volatile memory at 304 stores, or is tuned with, a first slope of ReLU, i.e., the slope (e.g., 206) of the positive region (e.g., 214); the non-volatile memory at 306 stores, or is tuned with, a second slope of ReLU, i.e., the slope (e.g., 208) of the negative region (e.g., 216) or zero. Thus, for example, when Vg is high, nFET is on and pFET is off, and a combination of the slope value stored in NVM 304 and the column output 114 is output as the activation function output 128; when Vg is low, nFET is off and pFET is on, and a combination of the slope value stored in NVM 306 and the column output 114 is output as the activation function output 128.

An apparatus that implements an analog memory-based activation function, in another embodiment can include a first non-volatile memory connected to a first field effect transistor (FET). The first non-volatile memory can be programmed or tuned to store a first parameter of an activation function associated with an artificial neural network. The apparatus can also include a second non-volatile memory connected to a second field effect transistor (FET), where the second non-volatile memory can be programmed or tuned to store a second parameter of the activation function associated with the artificial neural network. The first non-volatile memory and the second non-volatile memory can be connected in parallel to an input line 312, and the first field effect transistor and the second field effect transistor can be connected in parallel to an output line. For instance, the source terminal of the first field effect transistor can be connected to the first non-volatile memory and the source terminal of the second field effect transistor can be connected to the second non-volatile memory; the drain terminal of the first field effect transistor and the drain terminal of the second field effect transistor can be connected to the output line 314. In this way, a signal entering the input line can be transformed according to the activation function (e.g., the current flowing through one of the two paths constructed by the two non-volatile memories) into an activation function output, and output via the output line.

In an embodiment, the activation function can include a leaky rectified linear unit (ReLU), where a first slope of the leaky ReLU can be defined by the first parameter stored on the first non-volatile memory, and a second slope of the leaky ReLU can be defined by the second parameter stored on the second non-volatile memory. In an aspect, the first parameter can be proportional to conductance of the first non-volatile memory and the second parameter can be proportional to conductance of the second non-volatile memory.

In another embodiment, the activation function can include a rectified linear unit (ReLU), where a first slope of the ReLU can be defined by the first parameter stored on the first non-volatile memory, and a second slope of the ReLU can be defined by the second parameter stored on the second non-volatile memory, where the second slope is substantially flat, e.g., a zero or a value representing a zero substantially. For example, the second slope can be substantially smaller than the first slope, for instance, 100 times smaller by way of example.

In an embodiment, the apparatus may also include a crossbar array of memristive elements configured to perform multiply and accumulate operations, where at least one column output line of the crossbar array is connected to a gate voltage of the first FET and the second FET. For instance, each of the column output lines of the crossbar array can be connected to a set of circuit elements implementing an analog memory-based activation function (e.g., at least two non-volatile memory devices connected with FETs). In an embodiment, the first FET can be an n-channel field effect transistor (nFET), and the second FET can be a p-channel field effect transistor (pFET).

In an embodiment, the first parameter and the second parameter remain fixed as hyperparameters of the artificial neural network during training of the artificial neural network, while values stored on the memristive elements of the crossbar array are updated as part of the training.

As described above, non-volatile memory devices can be used to implement an analog memory-based activation function. Such analog memory-based activation function can be used for computing activation of a neuron in a neural network, for example, implemented on an analog memory based crossbar array. There can be at least two non-volatile memory devices, each storing a parameter value associated with the activation function. For example, slopes of a ReLU, leaky ReLU, or another. There can also be circuit elements connected to the non-volatile memory devices to control the selection of the current flow through paths of the two non-volatile memory devices. An analog memory-based crossbar array with integrated capacitor for deep learning can be integrated with the analog memory-based activation function device.

FIG. 4 is a flow diagram illustrating a method in an embodiment. The method can be performed for analog memory-based artificial neural networks (e.g., as shown in FIG. 1 and FIG. 3), for example, for providing analog memory-based activation functions. In this way, for example, analog signals representing results of multiply accumulate operations performed by crossbar arrays implementing an artificial neural network, need not be converted to digital signals for activation function computations. At 402, a first non-volatile memory is tuned to store a first parameter of an activation function of an artificial neural network, where the first non-volatile memory is connected or coupled to a column output of a crossbar array of memristive elements (e.g., resistive processing units shown in FIG. 1 and FIG. 3) implementing the artificial neural network.

At 404, a second non-volatile memory connected to the column output of the crossbar array of memristive elements, is tuned to store a second parameter of the activation function of the artificial neural network. The first non-volatile memory and the second non-volatile memory can be connected in parallel to the column output of the crossbar array.

At 406, while synaptic weights stored in the memristive elements of the crossbar array are updated during training of the artificial neural network, the first parameter and the second parameter can be kept fixed as hyperparameters of the artificial neural network. For instance, those values do not change during the training of the artificial neural network, during which the values of the memristive elements are updated. The first non-volatile memory and the second non-volatile memory implement an analog memory-based activation function of an analog memory-based artificial neural network.

In an embodiment, the activation function can be a leaky rectified linear unit (ReLU). A first slope of the leaky ReLU can be defined by the first parameter stored on the first non-volatile memory. A second slope of the leaky ReLU can be defined by the second parameter stored on the second non-volatile memory.

In another embodiment, the activation function can be a rectified linear unit (ReLU), where a first slope of the ReLU can be defined by the first parameter stored on the first non-volatile memory, and a second slope of the ReLU can be defined by the second parameter stored on the second non-volatile memory, where the second slope is substantially flat (e.g., zero or a value substantially representing a zero). For example, the second slope can be substantially smaller than the first slope, for instance, 100 times smaller by way of example.

In an embodiment, for example, as shown in FIG. 1, the first non-volatile memory is connected to a positive terminal of a first diode, and the second non-volatile memory is connected to a negative terminal of a second diode.

In another embodiment, for example, as shown in FIG. 3, the first non-volatile memory is connected to an n-channel field effect transistor (nFET) and the second non-volatile memory is connected to a p-channel field effect transistor (pFET), where at least one column output line of the crossbar array is connected to a gate voltage of the nFET and the pFET.

In an embodiment, only one non-volatile memory is used, since the current will pass through one branch of the two parallelly connected non-volatile memories depending on whether the voltage given (e.g., column output of the crossbar array) is high or low (e.g., positive or negative).

In the above description, memory elements NVM1 (118) and NVM2 (120) shown in FIG. 1 are both nonvolatile memory elements that can be tuned to obtain a first slope and second slope. However, in other embodiments, one of the memory elements can be a tunable non-volatile memory element, while the other can be a fixed element such as a fixed resistor. Similarly, memory elements NVM1 (304) and NVM2 (306) shown in FIG. 3 are both shown as nonvolatile memory elements that can be tuned. Again, however, in other embodiments, one of the memory elements can be a tunable non-volatile memory element, while the other can be a fixed element such as a fixed resistor. For example, one of the NVM can be substituted by a fixed resistor. For instance, in implementing the ReLU shown in FIG. 2B, a fixed element can substitute for, or replace a non-volatile memory element, for example, that stores a value representing a near flat slope.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a first non-volatile memory connected to a positive terminal of a first diode, the first non-volatile memory programmed to store a first parameter of an activation function associated with an artificial neural network; and
   a second non-volatile memory connected to a negative terminal of a second diode, the second non-volatile memory programmed to store a second parameter of the activation function associated with the artificial neural network,
   the first non-volatile memory and the second non-volatile memory being connected in parallel to an input line, and a negative terminal of the first diode and a positive terminal of the second diode being connected in parallel to an output line.

2. The apparatus of claim 1, wherein the activation function includes a leaky rectified linear unit (ReLU), wherein a first slope of the leaky ReLU is defined by the first parameter stored on the first non-volatile memory, and a second slope of the leaky ReLU is defined by the second parameter stored on the second non-volatile memory, the first parameter being proportional to conductance of the first non-volatile memory and the second parameter being proportional to conductance of the second non-volatile memory.

3. The apparatus of claim 1, wherein the activation function includes a rectified linear unit (ReLU), wherein a first slope of the ReLU is defined by the first parameter stored on the first non-volatile memory, and a second slope of the ReLU is defined by the second parameter stored on the second non-volatile memory, the first parameter being proportional to conductance of the first non-volatile memory and the second parameter being proportional to conductance of the second non-volatile memory.

4. The apparatus of claim 1, further including a crossbar array of memristive elements configured to perform multiply and accumulate operations, wherein at least one column output line of the crossbar array is connected to the input line.

5. The apparatus of claim 4, wherein the first parameter and the second parameter remain fixed as hyperparameters of the artificial neural network during training of the artificial neural network, while values stored on the memristive elements of the crossbar array are updated as part of the training.

6. The apparatus of claim 1, wherein the apparatus implements an analog memory-based activation function of an analog memory-based artificial neural network.

7. An apparatus comprising:
   a first non-volatile memory connected to a first field effect transistor (FET), the first non-volatile memory programmed to store a first parameter of an activation function associated with an artificial neural network; and
   a second non-volatile memory connected to a second field effect transistor (FET), the second non-volatile memory programmed to store a second parameter of the activation function associated with the artificial neural network,
   the first non-volatile memory and the second non-volatile memory being connected in parallel to an input line, and the first field effect transistor and the second field effect transistor being connected in parallel to an output line, wherein a source terminal of the first field effect transistor is connected to the first non-volatile memory and a source terminal of the second field effect transistor is connected to the second non-volatile memory, and wherein a drain terminal of the first field effect transistor and the drain terminal of the second field effect transistor are connected to the output line.

8. The apparatus of claim 7, wherein the activation function includes a leaky rectified linear unit (ReLU), wherein a first slope of the leaky ReLU is defined by the first parameter stored on the first non-volatile memory, and a second slope of the leaky ReLU is defined by the second parameter stored on the second non-volatile memory, the first parameter being proportional to conductance of the first non-volatile memory and the second parameter being proportional to conductance of the second non-volatile memory.

9. The apparatus of claim 7, wherein the activation function includes a rectified linear unit (ReLU), wherein a first slope of the ReLU is defined by the first parameter stored on the first non-volatile memory, and a second slope of the ReLU is defined by the second parameter stored on the second non-volatile memory, the first parameter being proportional to conductance of the first non-volatile memory and the second parameter being proportional to conductance of the second non-volatile memory.

10. The apparatus of claim 7, further including a crossbar array of memristive elements configured to perform multiply and accumulate operations, wherein at least one column output line of the crossbar array is connected to a gate voltage of the first FET and the second FET.

11. The apparatus of claim 10, wherein the first FET includes an n-channel field effect transistor (nFET), and the second FET includes a p-channel field effect transistor (pFET).

12. The apparatus of claim 10, wherein the first parameter and the second parameter remain fixed as hyperparameters of the artificial neural network during training of the artificial neural network, while values stored on the memristive elements of the crossbar array are updated as part of the training.

13. The apparatus of claim 7, wherein the apparatus implements an analog memory-based activation function of an analog memory-based artificial neural network.

14. A method comprising:
tuning a first non-volatile memory connected to a column output of a crossbar array of memristive elements, for the first non-volatile memory to store a first parameter of an activation function of an artificial neural network;

tuning a second non-volatile memory connected to the column output of the crossbar array of memristive elements, for the second non-volatile memory to store a second parameter of the activation function of the artificial neural network, the first non-volatile memory and the second non-volatile memory being connected in parallel to the column output of the crossbar array; and keeping the first parameter and the second parameter fixed as hyperparameters of the artificial neural network, while synaptic weights stored in the memristive elements of the crossbar array are updated during training of the artificial neural network.

15. The method of claim 14, wherein the activation function includes a leaky rectified linear unit (ReLU), wherein a first slope of the leaky ReLU is defined by the first parameter stored on the first non-volatile memory, and a second slope of the leaky ReLU is defined by the second parameter stored on the second non-volatile memory.

16. The method of claim 14, wherein the activation function includes a rectified linear unit (ReLU), wherein a first slope of the ReLU is defined by the first parameter stored on the first non-volatile memory, and a second slope of the ReLU is defined by the second parameter stored on the second non-volatile memory.

17. The method of claim 14, wherein the first non-volatile memory is connected to a positive terminal of a first diode, and the second non-volatile memory is connected to a negative terminal of a second diode.

18. The method of claim 14, wherein the first non-volatile memory is connected to an n-channel field effect transistor (nFET) and the second non-volatile memory is connected to a p-channel field effect transistor (pFET), wherein at least one column output line of the crossbar array is connected to a gate voltage of the nFET and the pFET.

19. The method of claim 14, wherein the first non-volatile memory and the second non-volatile memory implement an analog memory-based activation function of an analog memory-based artificial neural network.

20. The apparatus of claim 1, wherein the first non-volatile memory and the second non-volatile memory include at least one selected from a group consisting of resistive random access memory (RRAM), Electrochemical Random-Access Memory (ECRAM), ferroelectric random access memory (FeRAM), phase-change memory (PCM), conductive-bridging RAM (CBRAM), NOR flash, and magnetic RAM (MRAM).

* * * * *